(12) United States Patent
Zhang

(10) Patent No.: US 6,196,566 B1
(45) Date of Patent: Mar. 6, 2001

(54) LIGHTWEIGHT FOLDING BICYCLE

(76) Inventor: Guanli Zhang, Room 402, No. 46, Ting Lin Xin Jian New Village, Golden Mountain District, Shanghai City 201505 (CN)

( * ) Notice: Subject to any disclaimer, the term of this patent is extended or adjusted under 35 U.S.C. 154(b) by 0 days.

(21) Appl. No.: 09/325,899

(22) Filed: Jun. 4, 1999

(30) Foreign Application Priority Data

Jun. 5, 1998 (CN) .................................................. 98224211

(51) Int. Cl.[7] .................................................. B62K 15/00
(52) U.S. Cl. ........................... 280/287; 280/278; 280/639
(58) Field of Search .................................. 280/278, 287, 280/638, 639

(56) References Cited

U.S. PATENT DOCUMENTS

| | | | |
|---|---|---|---|
| 3,637,257 | * 1/1972 | Uncapher | 292/256.69 |
| 4,422,663 | * 12/1983 | Hon | 280/278 |
| 4,440,414 | * 4/1984 | Wang | 280/287 |
| 4,460,192 | * 7/1984 | Takamiya et al. | 280/287 |
| 5,052,706 | * 10/1991 | Tsi et al. | 280/287 |
| 5,337,609 | * 8/1994 | Hsu | 74/551.3 |
| 5,440,948 | * 8/1995 | Vheng | 74/551.3 |
| 5,492,350 | * 2/1996 | Pan | 280/278 |
| 5,906,452 | * 5/1999 | Lee | 403/325 |
| 6,032,971 | * 3/2000 | Herder | 280/278 |

FOREIGN PATENT DOCUMENTS

| | | |
|---|---|---|
| 90207463 | 5/1991 | (CN) . |
| 197 38 770 | * 3/1999 | (DE) . |

* cited by examiner

*Primary Examiner*—Brian L. Johnson
*Assistant Examiner*—Daniel Yeagley
(74) *Attorney, Agent, or Firm*—Akin, Gump, Strauss, Hauer & Feld, L.L.P.

(57) ABSTRACT

This lightweight folding bicycle adopts the four-bar-linkage-folding-frame. Two diagonal-bar-hinges are added. Each diagonal-bar-hinge is made up of two parts. One end of the diagonal-bar-hinge hinge joints in the middle of a seat tube at the same point as a standing tube hinged, the other end of the diagonal-bar-hinge joints in the middle of a crossbar at the same point as a down tube hinged. There is a four-bar-linkage-speed-folding-fastener on a handlebar stem and a folding device on the pedal. This type of folding bike is of simple structure, reasonable design and easy to fold. The four-bar-linkage-speed-folding-fastener grips a large area, which can press half the circle as maximum, so as to enlarge the suffering area and balance the received force. It is easy and quick to fold the bike and safe to drive.

5 Claims, 5 Drawing Sheets

LIGHTWEIGHT FOLDING BICYCLE

BACKGROUND OF THE INVENTION

This invention relates to a lightweight folding bicycle, particularly to the improvment on the structure of normal folding bicycle.

A shockproof foldable bicycle is disclosed in China Patent No.902074636. Its folding structure is with two seat tubes in front and back, their buttom ends hinge joint with the tail end of a crossbar respectively and the bottom end of the back crossbar joints a back fork simultaneously. The other end of the back fork joints a flat fork and the other end of the flat fork joints a standing tube and a down tube at the same point. The other end of the standing tube joints in the middle of the front seat tube and the other end of the down tube joints in the middle of the crossbar. The siting of the bike while unfolded is realized by a bidirectional-interlocking-device mounted in the tail end of the crossbar. A wedge clip on the knob of the bidirectional-interlocking-device embed on the sunken of the front seat tube bottom end to prevent the front seat tube rotating around an axle, so as to site the frame. Because the sunken in the bottom end of the front seat is near the axle while a saddle fixed on the top of the front seat tube is far from the axle and the seat tube leans back, the saddle endures weakly. Besides, the surface of the wedge clip is easy to be worn and then produce gap, it will bring some hidden danger to rider. A pedal has no folding device. A folding device of a handlebar stem is fixed by screws. This type of folding bicycle has a complicated structure and cannot be handled easily. It is also high cost, heavy weight, less loaded and the saftey of use cannot be insured.

SUMMARY OF THE INVENTION

Therefore the main object of the invention is to provide a lightweight folding bicycle which frame can be folded quickly.

Another object of the invention is to provide a lightweight folding bicycle which handlebar stem can be folded quickly.

A further object of the present invention is to provide a lightweight folding bicycle which pedal can be folded quickly.

This invention provide a lightweight folding bicycle, in which a frame connects front and back wheels through a driving system and a braking system, a handlebar is fixed on the front of a crossbar by a handlebar stem and the driving system links with a pedal through a crank. A saddle is fitted on the top end of a seat tube and the bottom end of the seat tube hinge joints with the tail end of the crossbar while this tail end joints the left and right hinge points of a back fork. The other end of the back fork joints a cross fork and the other end of the cross fork joints two standing tubes (left and right) at the same point as one end of a down tube hinged. The other end of the two standing tube joints in the middle of the seat tube and the other end of the down tube hinges in the middle of the crossbar. A diagonal-bar-hinge is added and made up of two parts, which hinges each other. One end of the diagonal-bar-hinge joints in the middle of the seat tube at the same point as the standing tube hinged and the other end of the diagonal-bar-hinge joints in the middle of the crossbar at the same point as the down tube hinged. The diagonal-bar-hinge has a spacing structure.

A four-bar-linkage-speed-folding-fasterner is installed between the bottom end of the handlebar stem and a fork column at the head of the crossbar. An upper hinge and a lower hinge of the fastener are respectively joint fixely with the two ends of the handlebar stem, these two hinges joint movably through a long pin axle. There is a notch in one side of the lower hinge where an adjustable nut joints movebaly. A concave buckle joints the lower hinge through a pin at one end and joints a slot through a pin at the other end. The cross section shape of the concave buckle is arc. The width of the slot is bigger than the height of the notch. The other end of the slot joints a supporting pole movably. One end of an adjustable screw joints the hole inside the supporting pole movably and the other end of the adjustable screw connects with the adjustable nut through a screw thread.

The pedal is collapsible. A rack hinge joints with a fixing spindle through a pin. There is a boss in the middle of a fixing pole and in one side of the boss there is a hole with screw thread. A compression spring covers the outer of the fixing pole and presses on the boss. The outside diameter of the boss is bigger than the diameter of the compression spring. The fit between the boss and the inside diameter of the fixing spindle is a sliding fit. One end of the fixing pole inserts into the inner hole of the rack and the other end of it is threaded connection with the pedal. The rack connects with the crank of the driving system through a threaded connection.

DETAILED DESCRIPTION OF THE PREFERRED EMBODIMENT

Figure 1:
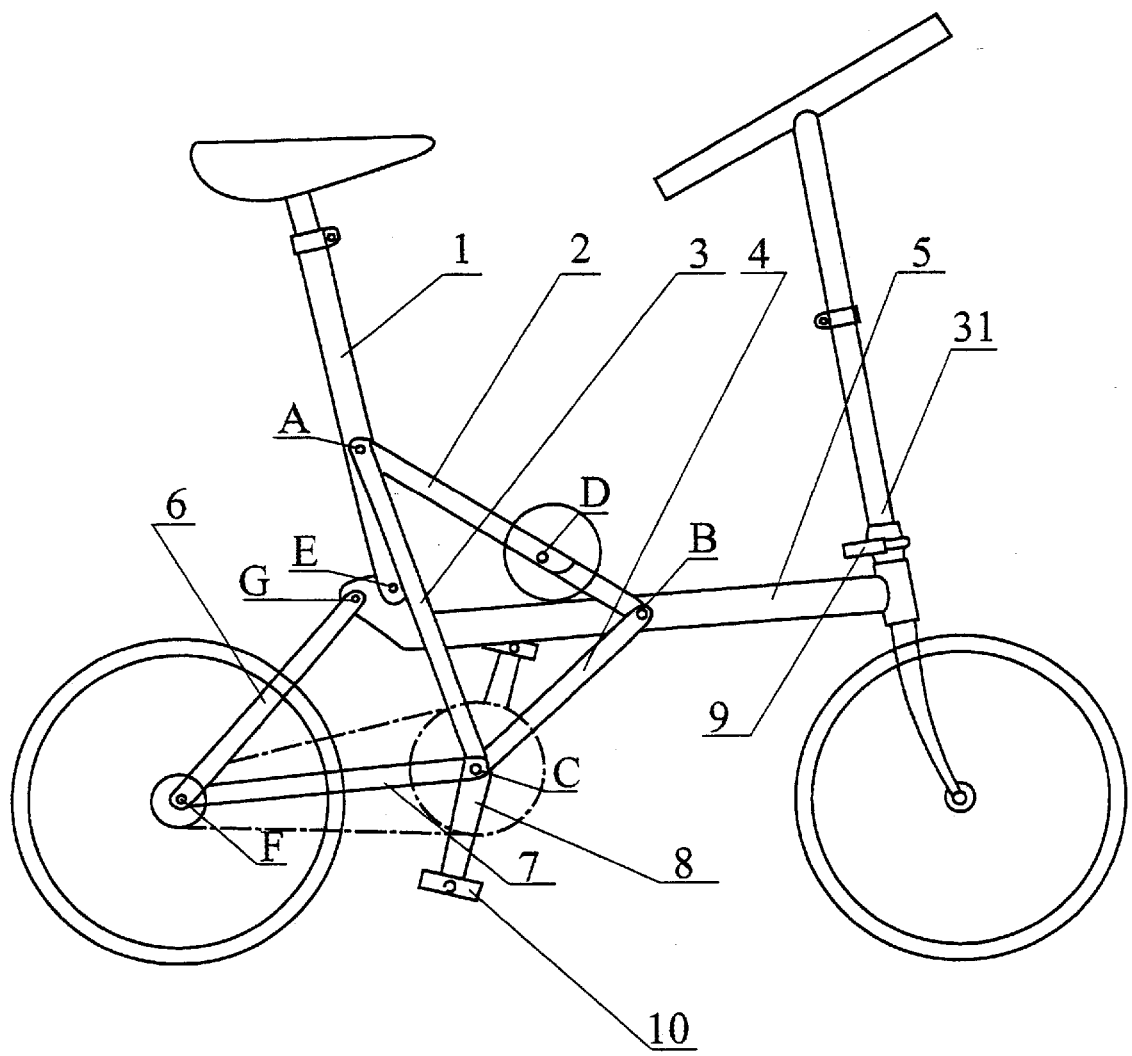
FIG. 1 is a view about the structure and work principle of the unfolded bicycle according to the invention.

This invention adopts a four-bar-linkage-folding-frame. The bottom end of a seat tube 1 hinge joints with the tail end of a crossbar 5 at E while this tail end joints left and right hinge points of a back fork 6 at G. The other end of the back fork 6 joints a cross fork 7 at F and the other end of the cross fork 7 joints the one end of standing tube 3 (left and right) and one end of a down tube 4 (left and right) at C. The other end of the two standing tubes 3 hinge in the middle of the seat tube 1 at point A and the other end of the down tube 4 joints in the middle of the crossbar 5 at B. A diagonal-bar-hinge 2 is added and made up of two parts, an upper part and lower part, which hinges each other at D. One end of the diagonal-bar-hinge 2 joints in the middle of the seat tube 1 at the same point A as the standing tube 3 hinged and the other end of the diagonal-bar-hinge 2 joints in the middle of the crossbar 5 at the same point as the down tube 4 hinged. The diagonal-bar-hinge has a spacing structure.

The diagonal-bar-hinge may have several kings of spacing structures. The spacing structure of the diagonal-bar-hinge 2 in the present invention is the a folding side on the upper part of the diagonal-bar-hinge. The folding side extends between side portions of the diagonal-hinge-bar and is parallel to a pin at point D for restricting the frame when the bicycle is unfolded. The maximum unfolding angle of the diagonal-bar-hinge 2 is 180 degrees.

There is a four-bar-linkage-speed-folding-fasterner 9 installed between the bottom end of a handlebar stem 31 and a fork column at the head of the crossbar 5. An upper hinge 11 and a lower hinge 13 of the fastener 9 joint fixedly with both sides of the handlebar stem 31. These two hinges joint movably through a long pin axle 19. There is a notch in one side of the lower hinge 13, which connects with an adjustable nut 15 movebly. A concave buckle 12 joints the lower hinge 13 through a pin 14 at one end and joints a slot 16 through a pin at the other end. The cross section shape of the concave buckle 12 is arc. The width of the slot 16 is bigger than the height of the notch. The other end of the slot 16 joints a supporting pole 18 movably. One end of an adjustable screw 17 joints the hole inside the supporting pole 18 movably and the other end of the adjustable screw 17 connects with the adjustable nut 15 through screw thread.

A pedal 10 is collapsible and works as follows. A rack 20 joints a fixing spindle 24 through a pin 21. There is a boss 25 in the middle of a fixing pole 22 and in the one side of the boss 25 there is a hole with screw thread. A compression spring 23 covers the outer of the fixing pole 22 and presses onto the boss 25. The outside diameter of the boss 25 is bigger than the diameter of the compression spring 23. The fit between the boss 25 and the inside diameter of the fixing spindle 24 is a sliding fit. One end of the fixing pole 22 inserts into the inner hole of the rack 20 and the other end of it links with the pedal 10 through threaded connection. The rack 20 connects with the crank 8 of the driving system through threaded connection. A transmission shaft of the driving system is located under hinge point C and links with the pedal 10 through the crank 8.

Figure 2:
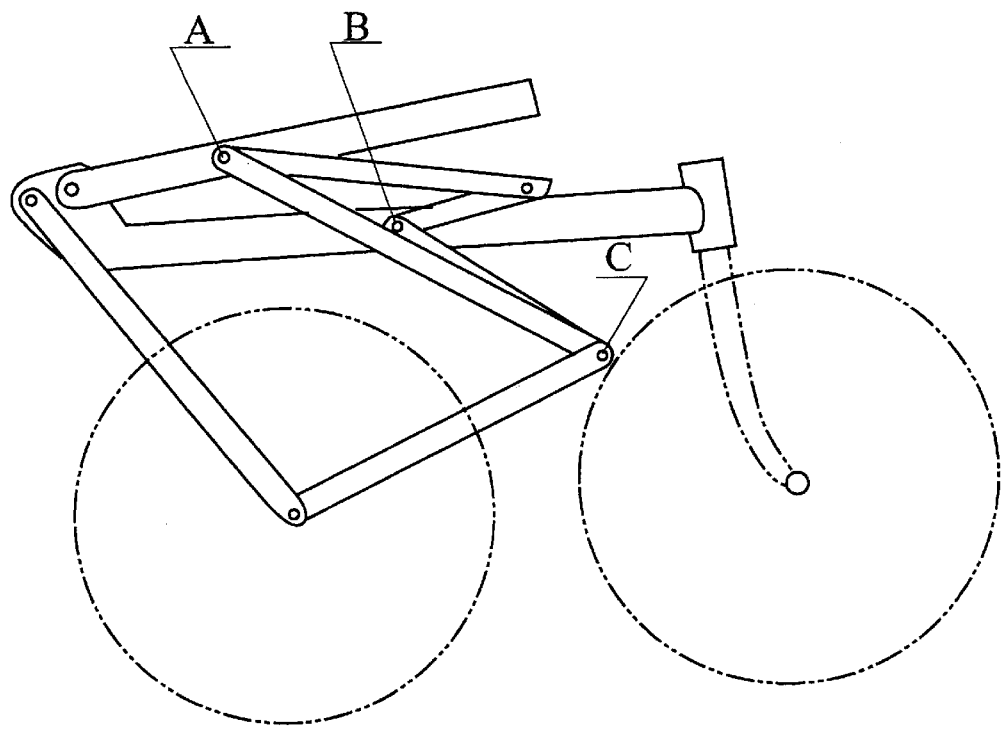
FIG. 2 is a view about the work principle of the frame in folded position.
Figure 3:
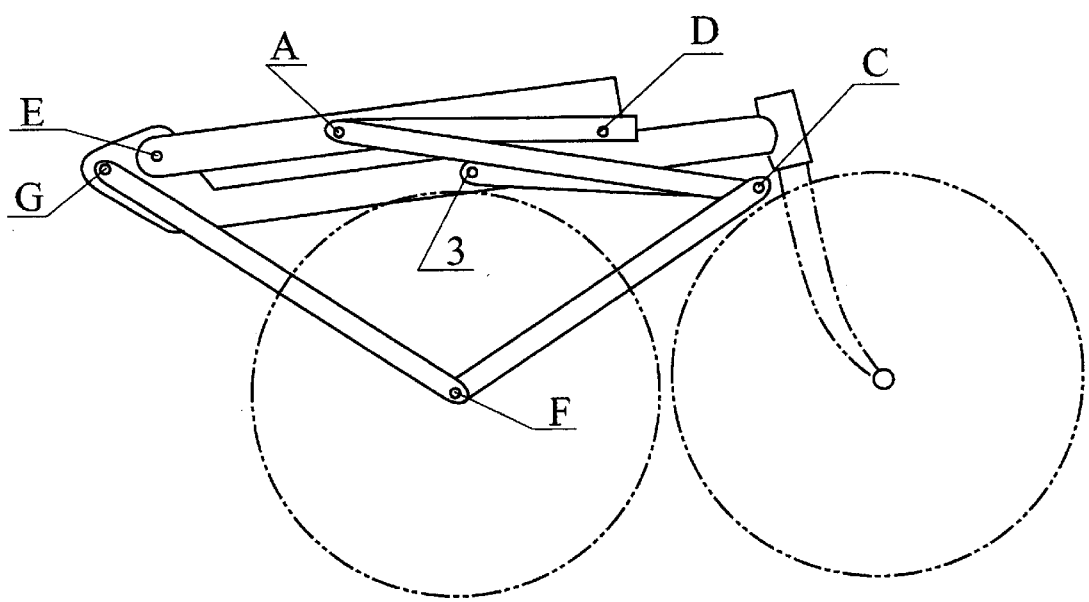
FIG. 3 is a view about the work principle of the frame in self-locked position.
Figure 4:
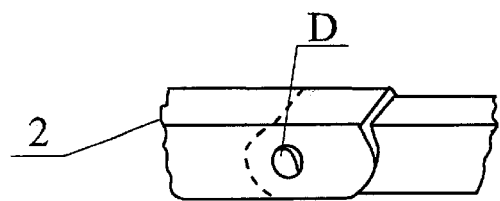
FIG. 4 is a view about the structure of the diagonal-bar-hinge.

The work principle of this four-bar-linkage-folding-frame is when the frame unfolded completely, the diagonal-bar-hinge 2 becomes a line and then two triangles are formed, i.e. $\triangle ABC$ and $\triangle ABE$. As triangle is the most stable geometary shape, the frame is in the most stable fixed state now. When we want to fold the frame, only need to move the hinge point D of the diagonal-bar-hinge 2 to the outside of the $\triangle ABC$ and then the original triangle form is broken and turns into a three quadrilaterals, i.e. quadrilateral ADBC, ADBE and BCFG. The shape of the whole frame changes gradually as the seat tube 1 closes up to the crossbar 5 around the point E. This shape change make the back wheel closes up to the front wheel until the frame is fully folded. As shown in FIG. 2, if we press the seat tube 1, the $\triangle ABC$ will turn into to a reverse $\triangle ACB$ and the frame will self-lock at this moment. As shown in FIG. 3, when we lift the seat tube 1 upward, the back wheel will not fall down under its gravity. The diagonal-bar-hinge 2 plays a very important role on siting and self-locking in this device.

The pedal folding device works as follows. When we want to fold the pedal 10, pull out the pedal 10 overcoming the pressure of the compression spring 23, pull the fixing pole 22 out of the inner hole of the rack 20 and then turn the fixing spindle 90 degrees towards the crank 8 around the pin 21. The pedal 10 is folded.

Figure 5:
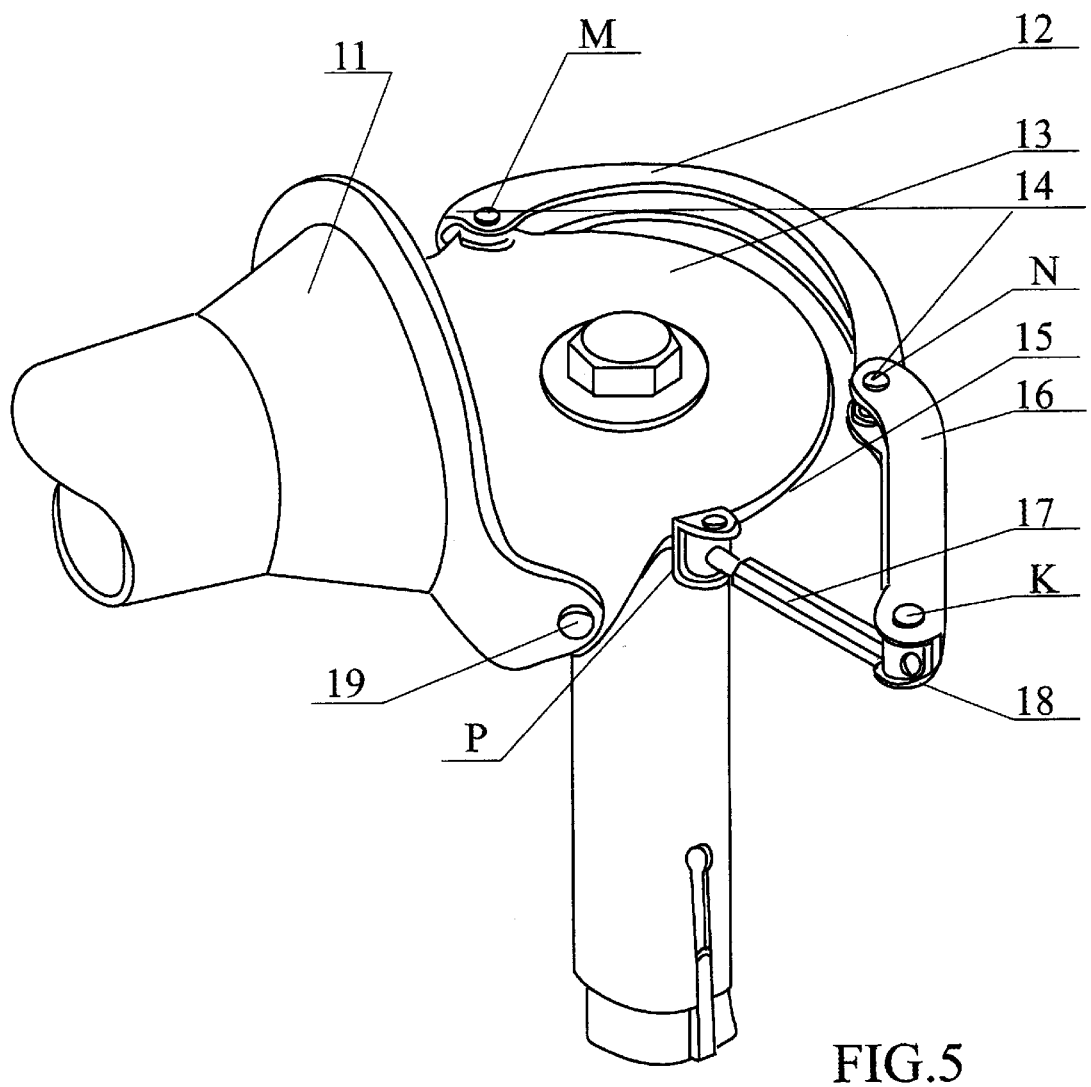
FIG. 5 is a view about the structure of the four-bar-linkage-speed-folding-fastener.
Figure 6:
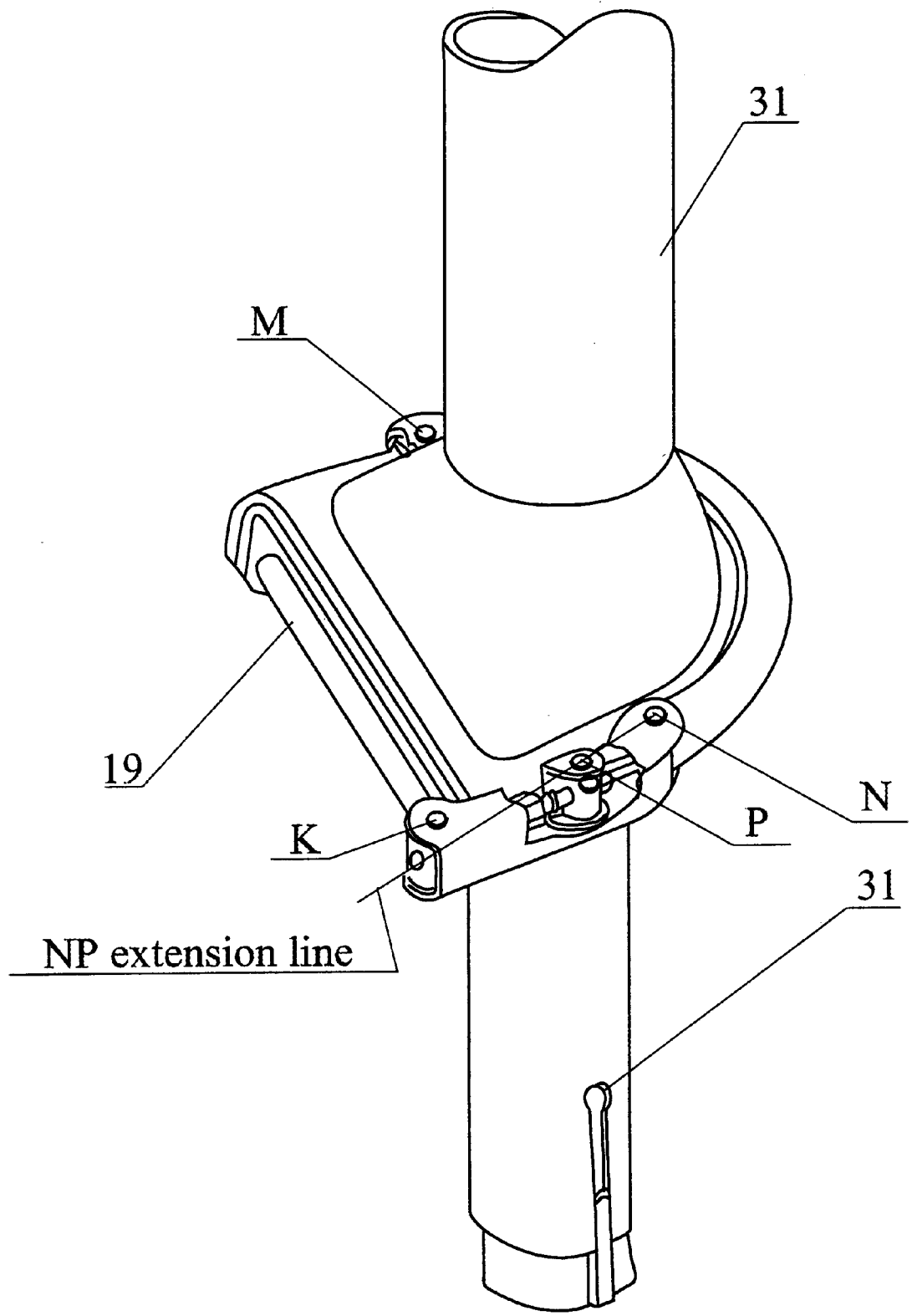
FIG. 6 is a view about the work principle of the four-bar-linkage-speed-folding-fastener.
Figure 7:
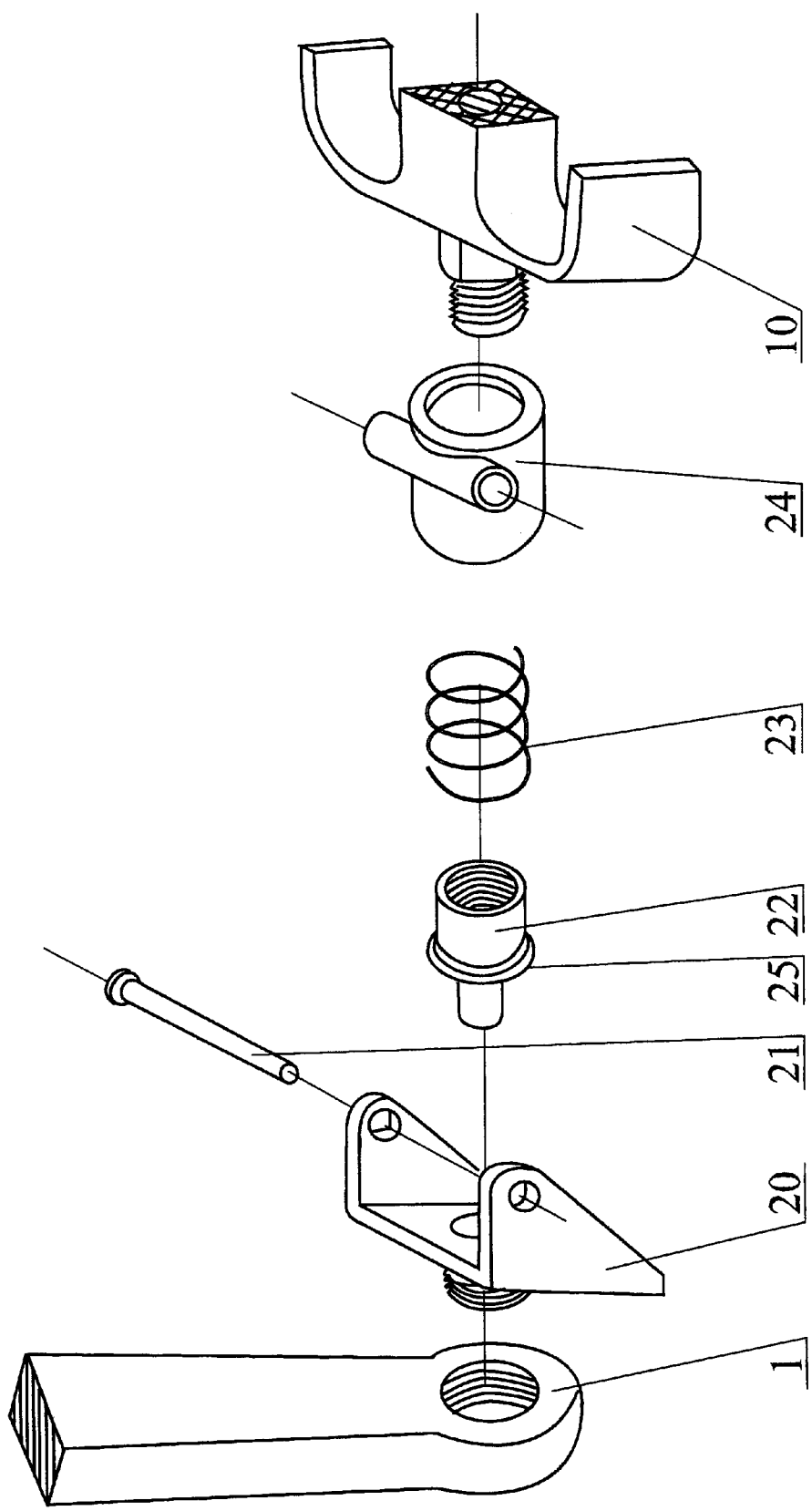
FIG. 7 is a view about the structure of the pedal folding device.

The four-bar-linkage-speed-folding-fastener works as follows. The two hinging points of the concave buckle 12 are M and N, the hinging point in the other end of the slot 16 is K and the thread connection point of the lower hinge is P. Before fastening, these points (M, N, K, P) form a horizontal quadrilateral, that is the structure of a four-bar-linkage-mechanism as shown in FIG. 5. When we combine the sides of the two hinges together and push the slot 16 close to the adjustable nut 15 (i.e. point P), the quadrilateral MNKP will turn into the triangle MNK at last as shown in FIG. 6. As the three points (K, P, N) locate on a line, there is a dead center. The concave buckle 12 grips the upper hinge 11 and lower hinge 13 firmly. When the point K is pushed beyond the NP's extension line, the fastener is in a self-locking state. As the length of the adjustable screw 17 can be adjusted longer and shorter, we can adjust the clamp force of the concave buckle 12 on the upper hinge 11 and lower hinge 13 according to needs. The above clamp force emerges as the joint force with the hinge plane due to the arc shaped cross section of the concave buckle 12.

With the above arrangement, we know the lightweigt folding bicycle in the present invention is of simple structure, reasonable design, easy to fold, light weight and low cost. The four-bar-linkage-speed-folding-fastener grips a large area, which can press half the circle as maximum, so as to enlarge the suffering area and balance the received force. Folding the bike is easy, simple, quick and driving is safe. Because the pedal 10 is collapsible, the bike occupies small space after folded, which brings great convenience to carrying and parking the bike.

The invention is not limited to the embodiments which are shown and which have been described in detail since they can be modified in various ways without departure from the scope of the invention. It is intended that the present invention only be limited by the terms of the appended claims.

What we claim is:

1. A lightweight folding bicycle, in which a frame connects front and back wheels through a driving system, a handlebar is fixed on a front of a crossbar (5) by a handlebar stem (31), the driving system links with a pedal (10) through a crank (8), a saddle is fitted on a top end of a seat tube (1) and a bottom end of the seat tube hinge joints with a tail end of the crossbar (5) while this tail end joints left and right hinge points of a back fork (6), opposite ends of the back fork (6) joints a cross fork (7) and opposite ends of the cross fork (7) joints an end of two standing tubes (3) at the same point as one end of a down tube (4), opposite ends of the two standing tubes (3) joint in a middle of the seat tube (1) and opposite ends of the down tube (4) hinges in a middle of the crossbar (5); wherein a diagonal-bar-hinge (2) is added and made up of two parts which are hinged together at opposing ends, an upper end of the diagonal-bar-hinge (2) joints in the middle of the seat tube (1) at the same point as the standing tube (3) hinged and a lower end of the diagonal-bar-hinge (2) joints in the middle of the crossbar (5) at the same point as the down tube (4), the diagonal-bar-hinge (2) has a spacing structure.

2. A lightweight folding bicycle according to claim 1, wherein a four-bar-linkage-speed-folding-fastener (9) is installed between a bottom end of the handlebar stem (31) and a fork column at a head of the crossbar (5), an upper hinge (11) and a lower hinge (13) of the fastener (9) are respectively fixedly joined with two ends of the handlebar stem (31), these two hinges are movable joined through a long pin axle (19), there is a notch in one side of the lower hinge (13) where an adjustable nut (15) joints movably, a concave buckle (12) couples with the lower hinge through a pin (14) at one end and hinges with one end of a slot at an opposite end of the concave buckle (16) through a pin, a cross section shape of the concave buckle (12) is in a form of an arc, a width of the slot (16) is bigger than a height of the notch, an opposite end of the slot (16) joints a supporting pole (18) movably, one end of an adjustable screw (17) joints a hole inside the supporting pole (18) movably, and an opposite end of the adjustable screw (17) connects with the adjustable nut (15) through a screw thread.

3. A lightweight folding bicycle according to claim 2, wherein the pedal (10) is collapsible, a rack (20) hinges with a fixing spindle (24) through a pin (21), there is a boss (25) in a middle of a fixing pole (22) and in a first side of the boss (25) there is a hole with a screw thread, a compression spring (23) covers an outer of the fixing pole (22) and presses on the boss (25), an outer surface diameter of the boss (25) is bigger than a diameter of the compressor spring (23), an engagement between the boss (25) and an inside diameter of the fixing spindle (24) is a sliding fit, a second side of the boss (25) of the fixing pole (22) inserts into an inner hole of the rack (20) and the first side of the fixing pole is threadably connected with the pedal (10), the rack (20) connects with the crank (8) of the driving system through a threaded connection.

4. A lightweight folding bicycle according to claim 1, wherein the pedal (10) is collapsible, in which a rack (20) hinges with a fixing spindle (24) through a pin (21), there is a boss (25) in a middle of a fixing pole (22) and in a first side of the boss (25) there is a hole with a screw thread, a compression spring (23) covers an outer surface of the fixing pole (22) and presses on the boss (25), an outside diameter of the boss (25) is bigger than a diameter of the compression spring (23), an engagement between the boss (25) and an inside diameter of the fixing spindle (24) is a sliding fit, a second side of the boss (25) of the fixing pole (22) inserts into an inner hole of the rack (20) and the first side of the fixing pole is threadably connected with the pedal (10), the rack (20) connects with the crank (8) of the driving system through a threaded connection.

5. A lightweight folding bicycle according to claim 1, wherein there is a folding side on an opposing hinged end of the diagonal-bar-hinge (2) to restrict the frame.

* * * * *